(12) United States Patent
Nakayama

(10) Patent No.: US 8,994,964 B2
(45) Date of Patent: Mar. 31, 2015

(54) IMAGE READING DEVICE AND IMAGE FORMING APPARATUS INCLUDING THE SAME FOR READING BOTH SIDES OF A DOCUMENT ALTERNATELY IN A SINGLE READ POSITION

(71) Applicant: KYOCERA Document Solutions Inc., Osaka (JP)

(72) Inventor: Toru Nakayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/283,128

(22) Filed: May 20, 2014

(65) Prior Publication Data

US 2014/0347683 A1 Nov. 27, 2014

(30) Foreign Application Priority Data

May 24, 2013 (JP) ................................. 2013-109733

(51) Int. Cl.
*G06K 15/16* (2006.01)
*H04N 1/00* (2006.01)

(52) U.S. Cl.
CPC .............. *G06K 15/16* (2013.01); *H04N 1/0057* (2013.01)
USPC ......................................................... 358/1.12

(58) Field of Classification Search
USPC ......................................................... 358/1.12
See application file for complete search history.

(56) References Cited

U.S. PATENT DOCUMENTS

| | | | |
|---|---|---|---|
| 5,634,187 A | * | 5/1997 | Ross .............................. 399/365 |
| 5,883,660 A | * | 3/1999 | Kato et al. .................... 347/262 |
| 2010/0188679 A1 | | 7/2010 | Nakagawa ................... 358/1.12 |

FOREIGN PATENT DOCUMENTS

| | | |
|---|---|---|
| JP | 2001-350298 A | 12/2001 |
| JP | 2010-171906 A | 8/2010 |

* cited by examiner

*Primary Examiner* — Ngon Nguyen
(74) *Attorney, Agent, or Firm* — Stein IP, LLC

(57) ABSTRACT

An image reading device includes a document transport controller and an operation portion. The document transport controller controls to discharge a document in one of two sheet discharging modes including a first sheet discharging mode in which the document is turned over again after both sides of the document have been read, and a second sheet discharging mode in which the document is discharged without being turned over again. The operation portion accepts an instruction to select one of the first sheet discharging mode and the second sheet discharging mode to discharge the document.

10 Claims, 13 Drawing Sheets

IMAGE READING DEVICE AND IMAGE FORMING APPARATUS INCLUDING THE SAME FOR READING BOTH SIDES OF A DOCUMENT ALTERNATELY IN A SINGLE READ POSITION

CROSS-REFERENCE TO RELATED APPLICATIONS

This application is based upon and claims the benefit of priority from the corresponding Japanese Patent Application No. 2013-109733 filed May 24, 2013, the entire contents of which are hereby incorporated by reference.

BACKGROUND OF THE INVENTION

The present disclosure relates to an image reading device and an image forming apparatus including the same.

Conventionally, there is known an image reading device capable of performing double-sided reading job in which both sides of a document can be read alternately in a single read position by turning over the document.

When this image reading device capable of performing the double-sided reading job receives an instruction to perform the double-sided reading job, it first transports the document set on a document setting tray to a read position, and hence one side of the document (facing upward when the document is set) is read in the read position. After this, the document whose one side has been read is turned over, and the turned-over document (document whose one side is read) is transported back to a position on an upstream side of the read position in the document transport direction. Then, the turned-over document (document whose one side is read) is transported to the read position again. In this case, because the document has been turned over, the opposite side to the one side of the document can be read in the read position. Then, after reading both sides of the document, the document whose both sides have been read is discharged onto a document discharge tray.

For instance, when a plurality of sheets of the document are set on the document setting tray and an instruction to perform the double-sided reading job is issued, the plurality of sheets of the document are transported one by one to be read sequentially. In this case, when the turned-over sheet of the document (whose both sides are read) is discharged as it is onto the document discharge tray, the one side of the sheet of the document (the side facing upward when the document is set) faces upward (in the same manner as when the document is set), and in this state the sheets of the document are stacked on the document discharge tray in order from the first read sheet of the document (uppermost sheet of the document when the document is set). Therefore, pages of the plurality of sheets of the document stacked on the document discharge tray are not in order. Therefore, when the user wants to sort the plurality of sheets of the document discharged onto the document discharge tray in correct order, the user must manually sort the plurality of sheets of the document though it is tiresome, and usability is not good.

Therefore, it may be considered to configure to turn over the sheet of the document again after reading both sides before discharging the sheet of the document onto the document discharge tray. However, with this structure, because the additional operation of turning over the sheet of the document is necessary, time from start to finish of the double-sided reading job is increased. Therefore, usability is degraded for user who wants to promptly finish the double-sided reading job.

SUMMARY OF THE INVENTION

An image reading device according to a first aspect of the present disclosure is capable of performing double-sided reading job for reading both sides of a document alternately in a single read position by turning over the document. The image reading device includes a document setting tray, an image reader, a document discharge tray, a main transport path, a reversing transport path, a document transport controller, and an operation portion. A document is set on the document setting tray. The image reader reads the document in the read position. The document after reading is discharged onto the document discharge tray. The main transport path is from the document setting tray via the read position to the document discharge tray. A reversing transport path branches from the main transport path on a downstream side of the read position and joins the main transport path on an upstream side of the read position of the main transport path. The document transport controller controls to transport the document along the main transport path, and controls to transport the document whose one side has been read in the read position along the reversing transport path so as to turn over the document and to transport the turned-over document to the read position when performing the double-sided reading job. The operation portion accepts a setting instruction concerning the double-sided reading job. Further, the document transport controller controls to discharge the document in one of two sheet discharging modes, including a first sheet discharging mode in which the document is turned over again after both sides of the document have been read in the read position and then is discharged onto the document discharge tray, and a second sheet discharging mode in which the document is discharged onto the document discharge tray without being turned over again. In addition, the operation portion accepts an instruction to select one of the first sheet discharging mode and the second sheet discharging mode to discharge the document.

An image forming apparatus according to a second aspect of the present disclosure includes the image reading device described above.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE DRAWINGS

An image forming apparatus including an image reading device of this embodiment is described with an example of a multifunction peripheral having a plurality of functions including a scan function, a print function, a copy function, and the like.

(General Structure of Image Forming Apparatus (Image Reading Device))

Figure 1:
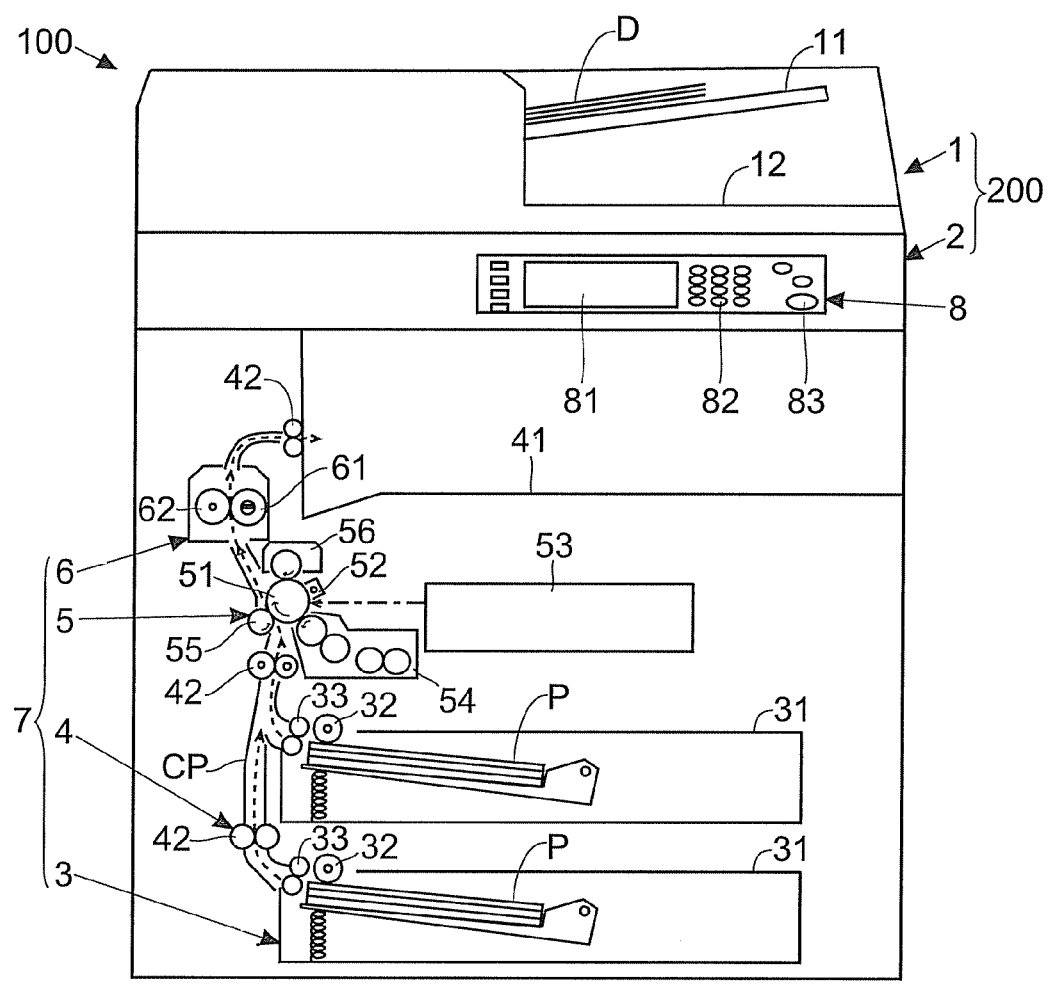
FIG. 1 is a schematic diagram of an image forming apparatus (image reading device) according to an embodiment of the present disclosure.

As illustrated in FIG. 1, an image forming apparatus 100 includes an image reading device 200 attached to an upper part of a main body. Note that a structure of the image reading device 200 is described later in detail.

In addition, the image forming apparatus 100 is equipped with an engine portion 7 including a paper sheet feeder 3, a sheet transporting portion 4, an image forming portion 5 and a fixing portion 6. Further, the engine portion 7 prints an image based on image data (for example, image data obtained by reading a document D by the image reading device 200) on a paper sheet P and outputs the paper sheet P.

The paper sheet feeder 3 includes a pickup roller 32 and a sheet feed roller pair 33, so as to feed the paper sheet P housed in a cassette 31 to a sheet transport path CP. The sheet transporting portion 4, which includes a plurality of transport roller pairs 42, transports the paper sheet P along the sheet transport path CP, and discharges the paper sheet P after printing to a discharge tray 41.

The image forming portion 5 includes a photoreceptor drum 51, a charging device 52, an exposing device 53, a developing device 54, a transfer roller 55, and a cleaning roller 56. Further, the image forming portion 5 forms a toner image based on the image data and transfers the toner image onto the paper sheet P. The fixing portion 6 includes a heating roller 61 and a pressing roller 62, so as to heat and press the toner image transferred onto the paper sheet P so that the toner image is fixed.

Figure 2:
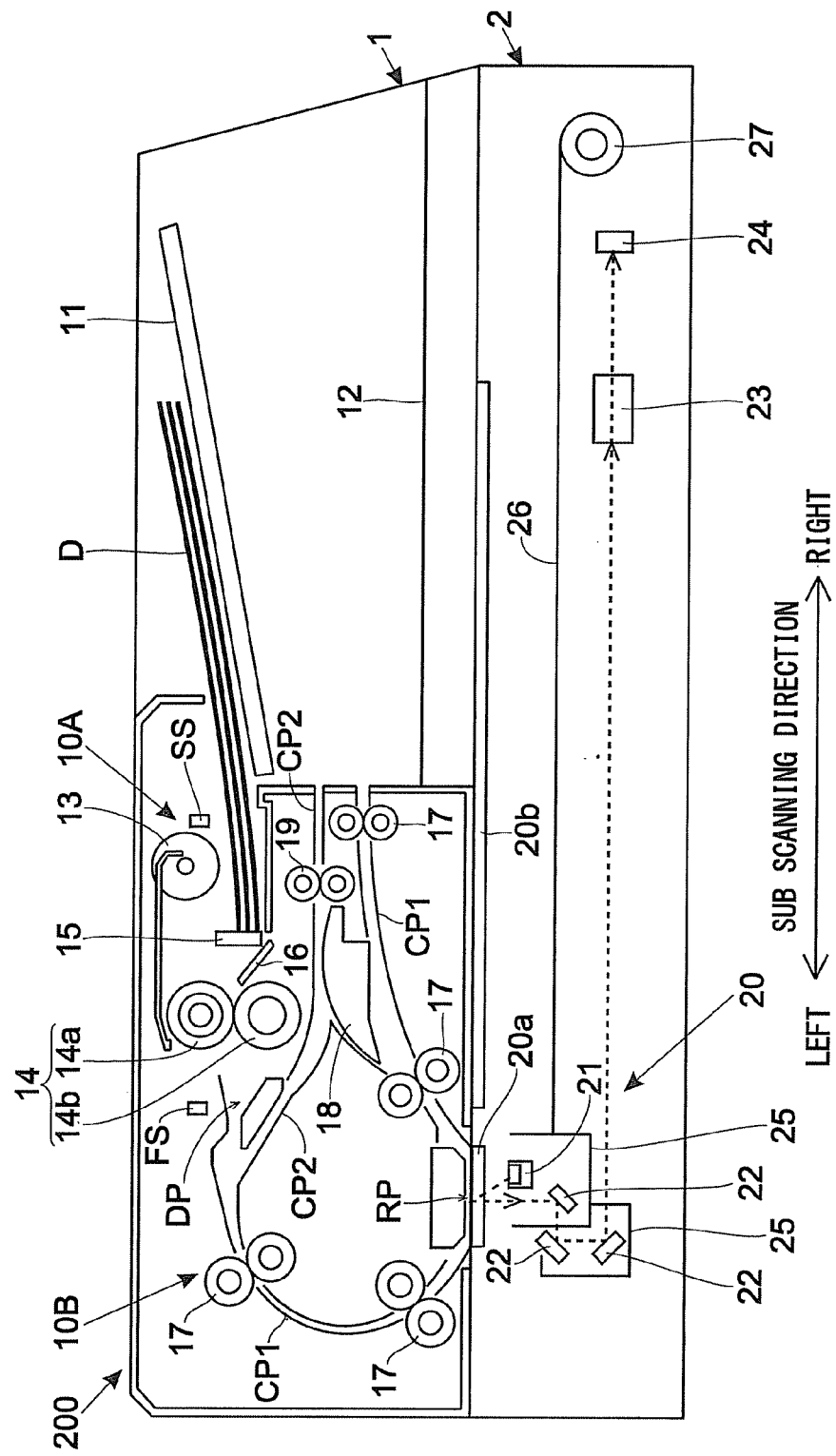
FIG. 2 is a detail diagram of the image reading device illustrated in FIG. 1.

In addition, as illustrated in FIG. 2, the image reading device 200 includes a contact glass 20a for transport reading and a contact glass 20b for place reading. Further, the image reading device 200 is configured to be capable of executing the transport reading in which the document D transported onto the contact glass 20a is read, and the place reading in which the document D placed on the contact glass 20b is read. Specifically, the image reading device 200 includes a document transport unit 1 for transporting the document D and an image reading unit 2 for reading the document D. Note that in the following description, the read position (on the contact glass 20a) in the transport reading is referred to as a read position RP.

The document transport unit 1 includes a document setting tray 11 on which the document D is set and a document discharge tray 12 to which the read document D is discharged. In addition, the document transport unit 1 has a main transport path CP1 as a document transport path for transporting the document D to the read position RP.

The main transport path CP1 extends from the document setting tray 11 via the read position RP to the document discharge tray 12. Thus, when the document D is transported from the document setting tray 11 to the main transport path CP1 and is transported along the main transport path CP1, the document D transported along the main transport path CP1 passes the read position RP. Then, one side of the document D (the side facing upward when the document D is set on the document setting tray 11) faces the contact glass 20a so that the one side of the document D is read in the read position RP. Then, in a single-sided reading job in which only one side of the document D is read, the document D whose one side has been read in the read position RP is then transported along the main transport path CP1 and is discharged onto the document discharge tray 12.

The document transport unit 1 also includes a reversing transport path CP2 as a document transport path for reversing front and rear of the document D in the document transport direction (for turning over the document D). This reversing transport path CP2 branches from the main transport path CP1 on a downstream side in the document transport direction of the read position RP and joins the main transport path CP1 on an upstream side in the document transport direction of the read position RP. Further, in the double-sided reading job for reading both the one side and the other side (opposite to the one side) of the document D, the document D whose one side has been read in the read position RP is not discharged to the document discharge tray 12 but is sent from the main transport path CP1 to the reversing transport path CP2.

The document D sent to the reversing transport path CP2 (document D whose one side has been read) is reversed in its front and rear in the document transport direction, and is returned to a position on the upstream side in the document transport direction of the read position RP in the main transport path CP1. Thus, the document D is turned over. The document D returned from the reversing transport path CP2 to the main transport path CP1 is transported along the main transport path CP1 so as to pass the read position RP again. In this case, because the document D is turned over, the other side of the document D (unread side) faces the contact glass 20a. Therefore, the other side of the document D is read in the read position RP. In this way, in the double-sided reading job, the document D is turned over so that both sides of the document D are alternately read in the single read position RP.

In addition, the document transport unit 1 includes a document sheet feeder 10A for transporting the document D from the document setting tray 11 to the main transport path CP1. The document sheet feeder 10A is disposed on the upstream side in the document transport direction of the main transport path CP1, and draws out the document D set in the document setting tray 11 so as to feed the document D to the main transport path CP1. Specifically, the document sheet feeder 10A includes a pickup roller 13, a sheet feed roller pair 14 (a drive roller 14a and a separation roller 14b), a document stopper 15, and the like.

The pickup roller 13 is attached in a swingable manner about a rotation axis of the drive roller 14a of the sheet feed roller pair 14, and stands by at an above position before starting document feeding (see FIG. 2). Further, when starting document feeding, the pickup roller 13 swings down so as to press the document D set on the document setting tray 11 (see FIG. 3). Thus, when the pickup roller 13 rotates, the document D set on the document setting tray 11 is drawn out. In addition, when the document setting tray 11 becomes empty after starting document feeding, the pickup roller 13 swings upward so as to return to the state before starting document feeding.

The sheet feed roller pair 14 is constituted of the drive roller 14a and the separation roller 14b, which are disposed to be opposed to each other. Drive force is transmitted from a motor (not shown) to the drive roller 14a so that the drive roller 14a rotates. The separation roller 14b rotates to follow rotation of the drive roller 14a. Then, the sheet feed roller pair 14 is disposed on the downstream side in the document transport direction of the pickup roller 13. In this way, when the document D is drawn out from the document setting tray 11, the document D enters a document feed nip of the sheet feed roller pair 14 (between the drive roller 14a and the separation roller 14b) and is transported in a rotation direction of the sheet feed roller pair 14 so as to be fed to the main transport path CP1.

Note that a torque limiter (not shown) is connected to the separation roller 14b. In this way, when one sheet of the document D enters the document feed nip, the separation roller 14b rotates following the document D fed in the document transport direction. On the other hand, when a plurality of sheets of the document D are overlapped and enter the document feed nip, the separation roller 14b does not rotate to follow. Therefore, only the uppermost sheet of the document D contacting with the drive roller 14a is fed in the document transport direction. In other words, occurrence of multiple feed is suppressed. In addition, in order to securely suppress the occurrence of multiple feed, a friction pad 16 is also disposed between the pickup roller 13 and the sheet feed roller pair 14 (just before the document feed nip).

The document stopper 15 is attached between the pickup roller 13 and the sheet feed roller pair 14 in a movable manner in an up and down direction. Before starting document feeding, the document stopper 15 is in a lower position so as to block the document transport path (see FIG. 2). In this case, front ends of sheets of the document D set on the document setting tray 11 abut the document stopper 15. In other words, the front ends of sheets of the document D are aligned by the document stopper 15. Then, when starting document feeding, the document stopper 15 moves upward so as to open the document transport path between the pickup roller 13 and the sheet feed roller pair 14 (see FIG. 3). In addition, when the document setting tray 11 becomes empty after starting document feeding, the document stopper 15 moves downward so as to return to the state before starting document feeding.

In addition, the document transport unit 1 is equipped with a document transport portion 10B. The document transport portion 10B transports the document D fed to the main transport path CP1 to the read position RP. Further, when performing double-sided reading job, the document transport portion 10B sends the document D whose one side has been read in the read position RP from the main transport path CP1 to the reversing transport path CP2 so that the document D returns to a position on the upstream side in the document transport direction of the read position RP in the main transport path CP1 and is transported to the read position RP again (transports the turned-over document D to the read position RP). This document transport portion 10B includes a transport roller pair 17, a switching claw 18, and a reverse roller pair 19.

A plurality of the transport roller pairs 17 are disposed along the main transport path CP1. Further, when the document D is fed to the main transport path CP1, the transport roller pairs 17 transport the document D along the main transport path CP1. Thus, the document D fed to the main transport path CP1 passes the read position RP.

The switching claw 18 is attached in a swingable manner at a branch point of the main transport path CP1 and the reversing transport path CP2 on the downstream side in the document transport direction of the read position RP. Further, when the document D after passing the read position RP is discharged onto the document discharge tray 12, the switching claw 18 swings to block the document transport path between the main transport path CP1 and the reversing transport path CP2 (see FIG. 2). In this way, the document D after passing the read position RP (document D transported by the transport roller pair 17) is not sent to the reversing transport path CP2 but is transported along the main transport path CP1 as it is so as to be discharged onto the document discharge tray 12.

Figure 3:
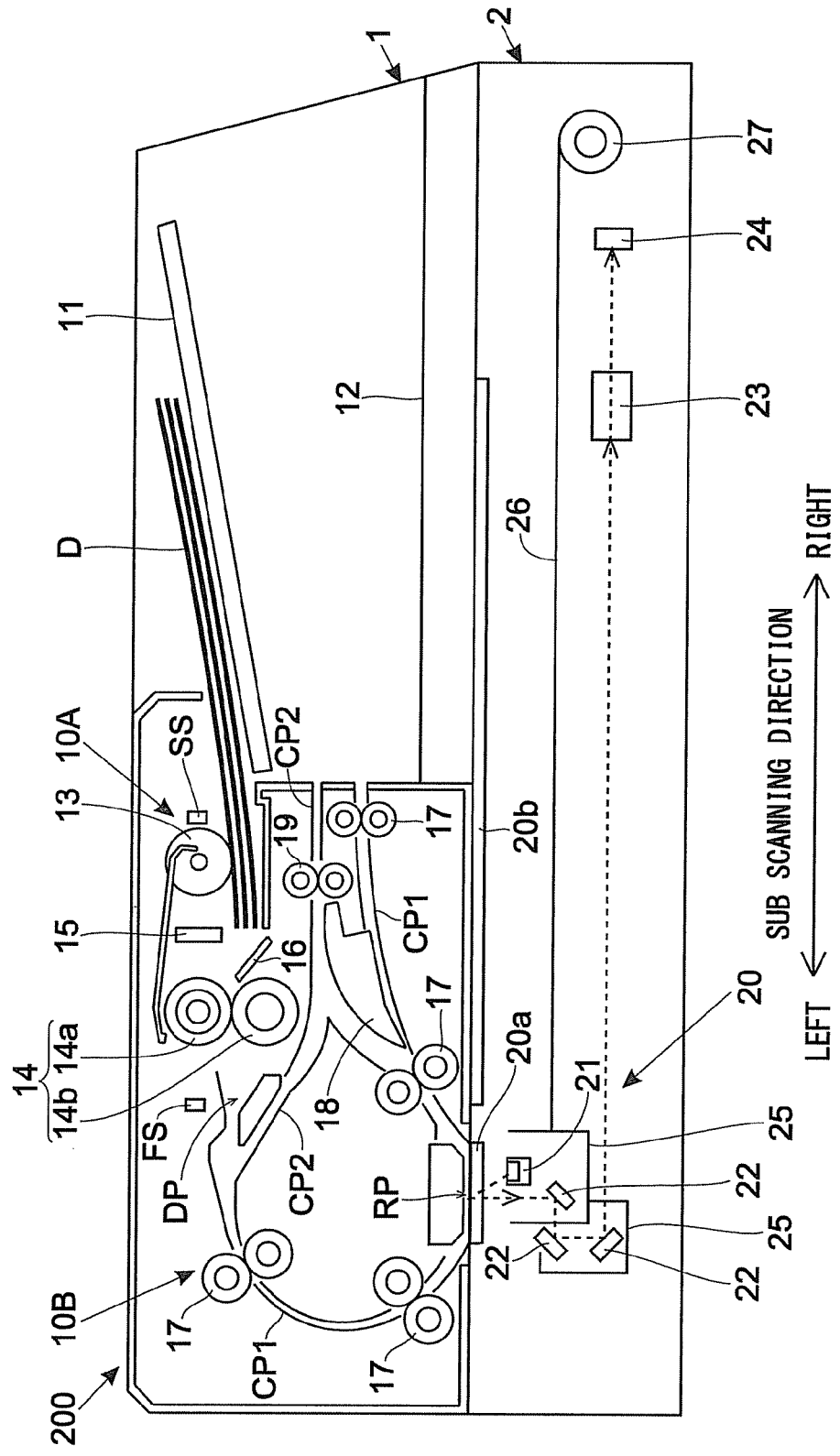
FIG. 3 is a detail diagram of the image reading device illustrated in FIG. 1.

In addition, when the document D after passing the read position RP is sent to the reversing transport path CP2, the switching claw 18 swings to open the document transport path between the main transport path CP1 and the reversing transport path CP2 (see FIG. 3). In this way, the document D after passing the read position RP (document D transported by the transport roller pair 17) is sent to the reversing transport path CP2 and is not discharged onto the document discharge tray 12.

The reverse roller pair 19 is a roller pair for reversing front and rear in the document transport direction of the document D sent to the reversing transport path CP2 and can be switched between forward and reverse directions of rotation. When the document D is sent to the reversing transport path CP2, the reverse roller pair 19 rotates in a forward direction so as to send the document D to the discharge tray 12 side so from the front end thereof. Further, when the rear end of the document D enters the reversing transport path CP2, the reverse roller pair 19 rotates in a reverse direction before the rear end of the document D passes by. Then, the switching claw 18 swings to block the document transport path between the main transport path CP1 and the reversing transport path CP2. In this way, the document D sent to the reversing transport path CP2 is transported along the reversing transport path CP2 in the state where the front and rear thereof in the document transport direction is reversed, and is returned to a position on the upstream side in the document transport direction of the read position RP in the main transport path CP1. Further, when the document D is returned from the reversing transport path CP2 to the main transport path CP1, the document D is turned over.

In addition, the document transport unit 1 includes a document set sensor SS for detecting presence or absence of the document D on the document setting tray 11. The document set sensor SS is a reflective optical sensor including a light emitting portion and a light receiving portion. As to this document set sensor SS, when there is the document D on the document setting tray 11, light from the light emitting portion is reflected by the document D, and the light receiving portion receives the light reflected by the document D. On the other hand, when there is no document D on the document setting tray 11, the light from the light emitting portion is not reflected by the document D so that the light receiving portion cannot receive light. In this way, the document set sensor SS changes the output between the case where there is the document D on the document setting tray 11 and the case where there is no document D on the document setting tray 11. Alternatively, it is possible to use an optical sensor with an actuator as the document set sensor SS, in which an optical path between the light emitting portion and the light receiving portion is blocked (or opened) when there is the document D on the document setting tray 11, while the optical path between the light emitting portion and the light receiving portion is opened (or blocked) when there is no document D on the document setting tray 11.

Further, the document transport unit 1 includes a plurality of document transport sensors FS for detecting presence or absence of the document D (arrival and pass of the document D) at a plurality of positions in the document transport path (the main transport path CP1 and the reversing transport path CP2). The plurality of document transport sensors FS are optical sensors, each of which changes the output based on whether or not there is the document D at a corresponding detection position. For instance, one of the plurality of document transport sensors FS is used for detecting presence or absence of the document D at a position between the sheet feed roller pair 14 and the transport roller pair 17 closest to the sheet feed roller pair 14 (hereinafter referred to as a detection position DP). Note that FIG. 2 illustrates only the document transport sensor FS for detecting presence or absence of the document D at the detection position DP in order to facilitate viewing the diagram.

The image reading unit 2 is equipped with an image reader 20 including a lamp 21, mirrors 22, a lens 23, an image sensor 24, and the like.

The lamp 21 includes a plurality of LED elements generating light for irradiating the document D. The plurality of LED element are linearly arranged in main scanning direction as a reading line direction (perpendicular to a paper plane of FIG. 2) though it is not shown. Note that a cold cathode fluorescent lamp or the like may be used as the lamp 21. Further, when reading the document D transported onto the contact glass 20a, the lamp 21 emits light to the contact glass 20a (light after passing through the contact glass 20a irradiates the document D). On the other hand, when reading the document D placed on the contact glass 20b, the lamp 21 emits light to the contact glass 20b (light after passing through the contact glass 20b irradiates the document D). Reflection light reflected by the document D is reflected by the mirrors 22 and is led to the lens 23. The lens 23 focuses the reflection light.

The image sensor 24 receives the reflection light reflected by the document D (light focused by the lens 23) so as to read the document D by line unit. This image sensor 24 is constituted of a CCD including a plurality of photoelectric conversion elements arranged linearly in the main scanning direction. When receiving the reflection light, the image sensor 24 performs photoelectric conversion for each pixel by line unit so as to accumulate charge. Then, the image sensor 24 outputs an analog signal corresponding to the accumulated charge. In other words, an analog output of each pixel of the image sensor 24 varies in accordance with amount of the reflection light.

In addition, the lamp 21 and the mirrors 22 are held by a moving frame 25 capable of moving in sub scanning direction perpendicular to the main scanning direction. The moving frame 25 is connected to an end of a wire 26. The other end of the wire 26 is connected to a winding drum 27 that rotates to wind the wire 26. In this way, when the winding drum 27 rotates, the moving frame 25 moves in the sub scanning direction so that the lamp 21 and the mirrors 22 moves together with the moving frame 25 in the sub scanning direction. Note that a plurality of the wires 26 are connected to the moving frame 25 so that the plurality of wires 26 are stretched.

When reading the document D transported onto the contact glass 20a, the moving frame 25 moves to a position below the contact glass 20a. After that, the document transport unit 1 transports the document D onto the contact glass 20a. Then, the lamp 21 emits light to the document D passing on the contact glass 20a, and the image sensor 24 continuously repeats photoelectric conversion of the reflection light reflected by the document D. In this way, the document D is read by line unit.

On the other hand, when reading the document D placed on the contact glass 20b, the moving frame 25 moves in the sub scanning direction (from left to right viewed from the front). Then, during the period while the moving frame 25 is moving in the sub scanning direction, the lamp 21 emits light to the document D placed on the contact glass 20b, and the image sensor 24 continuously repeats photoelectric conversion of the reflection light reflected by the document D. In this way, the document D is read by line unit.

In addition, with reference to FIG. 1 again, the image forming apparatus 100 (image reading device 200) is equipped with an operation panel 8. The operation panel 8 includes an LCD display portion 81 with a touch panel. This LCD display portion 81 displays software keys for accepting various settings and the like made by a user and messages. Further, the operation panel 8 also includes hardware keys such as a ten-key 82 and a start key 83.

(Hardware Structure of Image Forming Apparatus (Image Reading Device))

Figure 4:
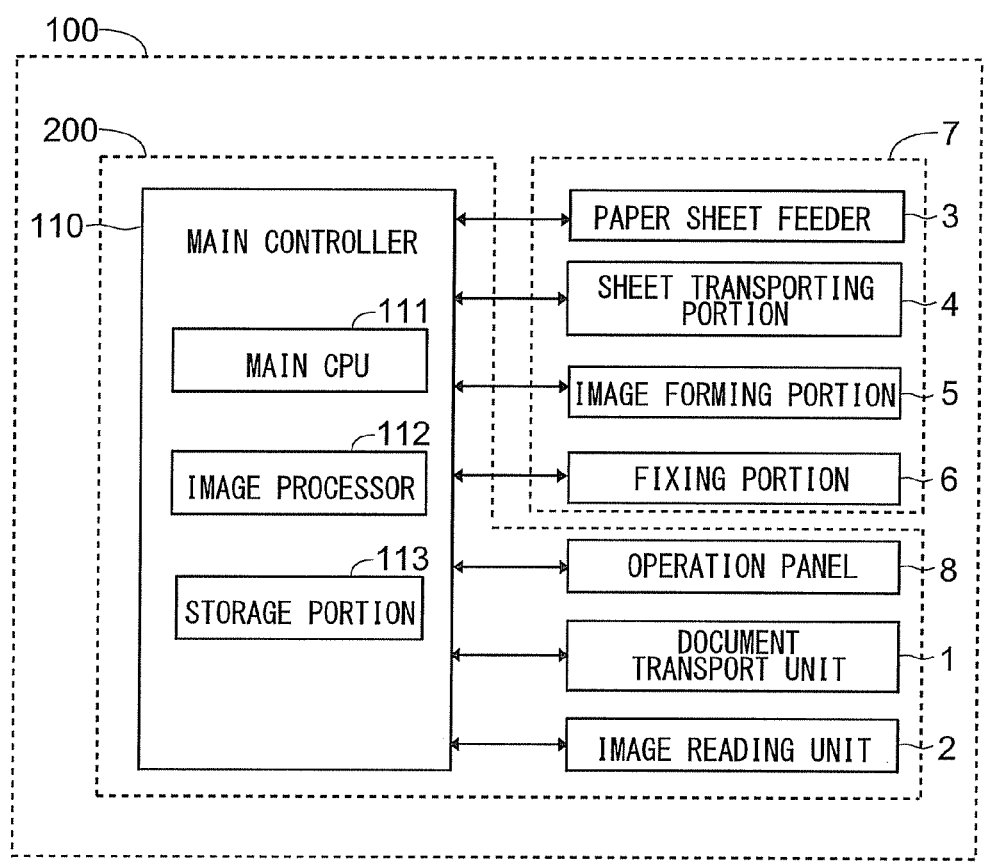
FIG. 4 is a block diagram for explaining a hardware structure of the image forming apparatus (image reading device) illustrated in FIG. 1.

As illustrated in FIG. 4, the image forming apparatus 100 (image reading device 200) includes a main controller 110. The main controller 110 includes a main CPU 111, an image processor 112, and a storage portion 113. The image processor 112 is constituted of an ASIC dedicated for image processing, or the like. The image processor 112 performs image processing (enlargement/reduction, density conversion, data format conversion, and the like) on the image data. The storage portion 113 is constituted of a ROM, a RAM, and the like, so as to store programs and data. Further, the main controller 110 performs general control of the image forming apparatus 100 based on the program and the data stored in the storage portion 113.

Figure 5:
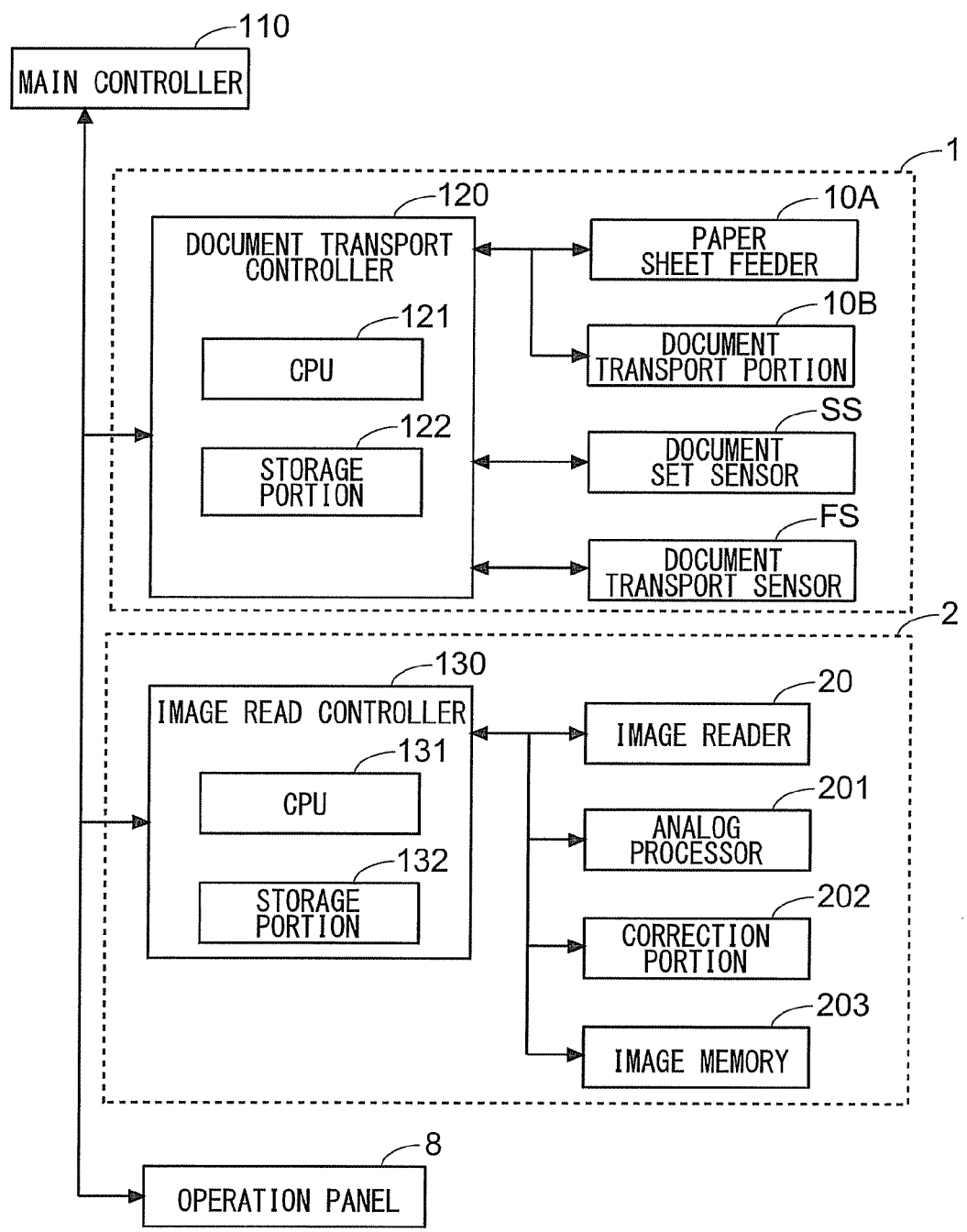
FIG. 5 is a block diagram for explaining a hardware structure of the image reading device illustrated in FIG. 1.

In addition, as illustrated in FIG. 5, the image forming apparatus 100 (image reading device 200) includes a document transport controller 120 and an image read controller 130. The document transport controller 120 includes a CPU 121 and a storage portion 122. The document transport controller 120 receives an instruction from the main controller 110 so as to control sheet feed operation by the document sheet feeder 10A and document transport operation by the document transport portion 10B. The image read controller 130 includes a CPU 131 and a storage portion 132. The image read controller 130 receives an instruction from the main controller 110 so as to control an image read operation by the image reader 20.

The document transport controller 120 is connected to the document set sensor SS and detects presence or absence of the document D on the document setting tray 11 based on the document set sensor SS. In this structure, the document setting tray SS connected to the document transport controller 120 corresponds to a "document set detector" of the present disclosure.

Further, the document transport controller 120 is connected to the plurality of document transport sensors FS and detects presence or absence of the document D at the plurality of positions in the document transport path (the main transport path CP1 and the reversing transport path CP2) based on outputs of the plurality of document transport sensors FS. For instance, the document transport controller 120 detects presence or absence of the document D at the detection position DP so as to measure sheet feed timing or to count the number of fed sheets.

The image read controller 130 is connected to an analog processor 201, a correction portion 202, and an image memory 203, so as to process an output of the image reader 20 (analog output of the image sensor 24). The analog processor 201 includes an amplifier circuit, an ND conversion circuit, and the like. Further, the analog processor 201 amplifies the analog output of the image sensor 24 and converts into digital image data so as to outputs the result. The correction portion 202 performs correction such as shading correction. The image memory 203 accumulates image data and transmits them to the main controller 110 (image processor 112).

In addition, the main controller 110 is connected to the operation panel 8 so as to control display operation of the operation panel 8 and to detect an operation performed by the user with the operation panel 8. For instance, when the user presses the start key 83, the operation panel 8 accepts the pressing operation as an instruction to execute the reading job (single-sided reading job or double-sided reading job). Then, when the operation panel 8 accepts the executing instruction of the reading job, the main controller 110 instructs individual portions of the document transport controller 120 and the image read controller 130 so as to control the document transport unit 1 and the image reading unit 2 to execute the reading job.

The operation panel 8 also accepts setting about the reading job. For instance, the operation panel 8 accepts setting of the sheet discharging mode for discharging the document D after reading the both sides. In this structure, the operation panel 8 corresponds to the "operation portion" of the present disclosure. Note that the sheet discharging mode will be described later.

(Sheet Discharging Mode)

When performing the double-sided reading job, after both sides of the document D have been read in the read position RP, the image reading device 200 discharges the document D to the document discharge tray 12 in one of the first sheet discharging mode and the second sheet discharging mode. In the first sheet discharging mode, after reading both sides of the document D in the read position RP, the document D is turned over again and then is discharged to the document discharge tray 12. In the second sheet discharging mode, after reading both sides of the document D in the read position RP, the document D is discharged to the document discharge tray 12 without being turned over again.

Figure 6:
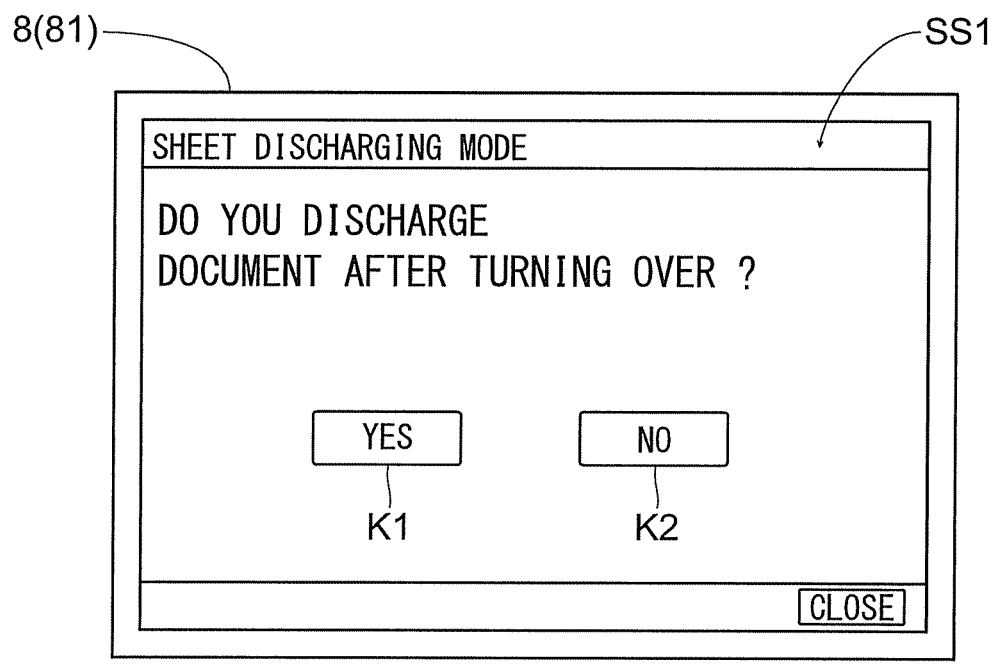
FIG. 6 is a diagram of an acceptance screen displayed when accepting an instruction to select a sheet discharging mode in the image reading device illustrated in FIG. 1.

The operation panel 8 accepts an instruction to select one of the first sheet discharging mode and the second sheet discharging mode for discharging the document D. For instance, when accepting the instruction to select the sheet discharging mode, the operation panel 8 displays an acceptance screen SS1 as illustrated in FIG. 6. Note that a touch operation of a software key K1 indicating "YES" on the acceptance screen SS1 is the operation for selecting the first sheet discharging mode, and a touch operation of a software key K2 indicating "NO" is the operation for selecting the second sheet discharging mode.

Hereinafter, with reference to FIGS. 7A to 7F, an operation of discharging the document D in the first sheet discharging mode is specifically described. Note that in the following description, it is supposed that a bunch of the document (a plurality of stacked sheets of the document D) is set on the document setting tray 11.

Figure 7A:
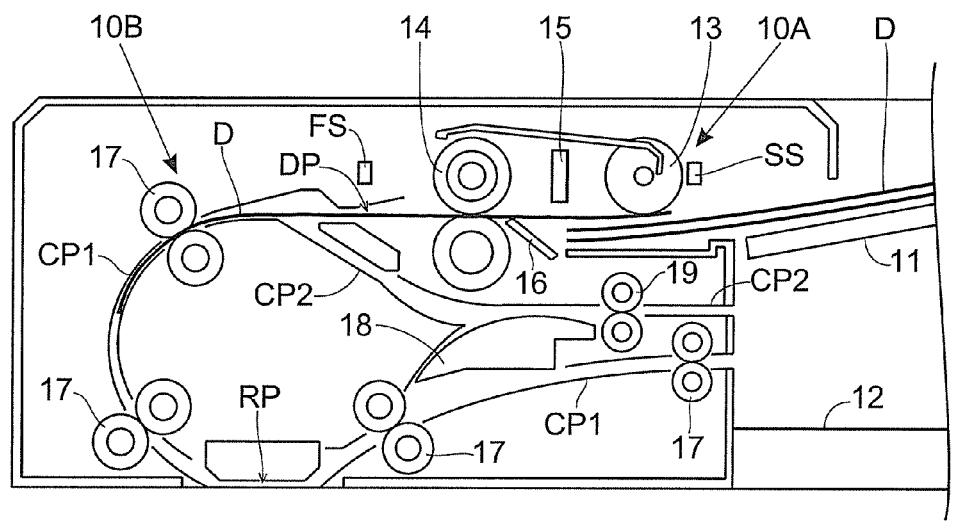
FIG. 7A is a diagram for explaining an operation of transporting the document when a plurality of sheets of the document are set on the document setting tray in the image reading device illustrated in FIG. 1.

First, when accepting an instruction to perform the double-sided reading job, the document transport controller 120 controls the document sheet feeder 10A to perform the sheet feed operation and controls the document transport portion 10B to perform the document transport operation. Specifically, as illustrated in FIG. 7A, the document sheet feeder 10A swings the pickup roller 13 downward to contact with the document D and moves the document stopper 15 upward to open the document transport path. In this state, the document sheet feeder 10A rotates the pickup roller 13 and the sheet feed roller pair 14 so as to feed the document D set on the document setting tray 11 to the main transport path CP1.

The document transport portion 10B rotates the transport roller pair 17 so as to transport the document D fed to the main transport path CP1 along the main transport path CP1. In this way, because the document D is transported to the read position RP and passes the read position RP, one side of the document D (the side facing upward when being set on the document setting tray 11) is read in the read position RP.

Figure 7B:
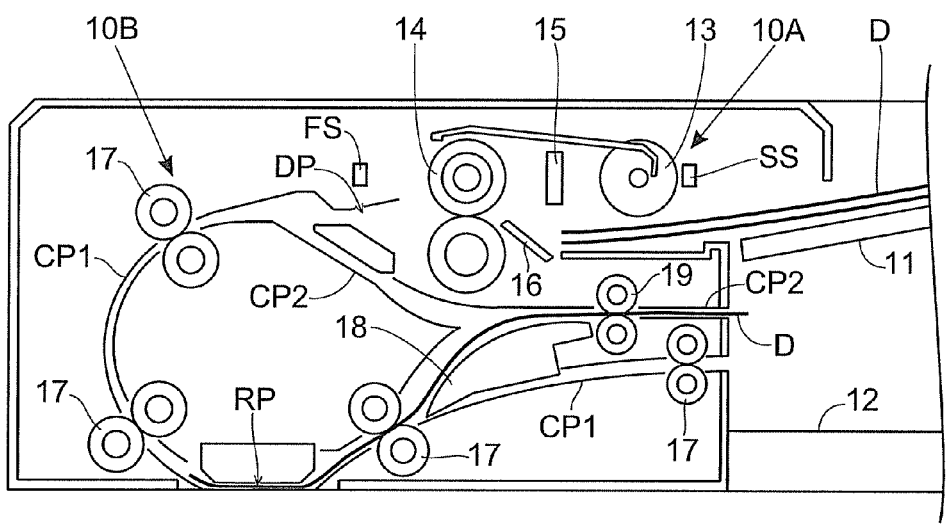
FIG. 7B is a diagram for explaining the operation of transporting the document when a plurality of sheets of the document are set on the document setting tray in the image reading device illustrated in FIG. 1.

In addition, the document transport portion 10B swings the switching claw 18 so that the document transport path between the main transport path CP1 and the reversing transport path CP2 is opened before the front end of the document D reaches the branch point of the main transport path CP1 and the reversing transport path CP2. In this way, as illustrated in FIG. 7B, the document D after passing the read position RP is sent to the reversing transport path CP2.

After that, the document transport portion 10B performs document reversing operation for turning over the document D. Specifically, the document transport portion 10B rotates the reverse roller pair 19 in the forward direction so as to send the document D to the discharge tray 12 side from the front end thereof. Further, when the rear end of the document D enters the reversing transport path CP2, the document transport portion 10B rotates the reverse roller pair 19 in the reverse direction before the rear end of the document D passes by the reverse roller pair 19, so as to reverse the front and rear of the document D in the document transport direction. In this case, the document transport portion 10B swings the switching claw 18 so that the document transport path between the main transport path CP1 and the reversing transport path CP2 is blocked. In this way, the document D whose front and rear is reversed in the document transport direction is transported along the reversing transport path CP2 and returns to a position on the upstream side in the document transport direction of the read position RP in the main transport path CP1. Then, the document D after returning from the reversing transport path CP2 to the main transport path CP1 is turned over.

Figure 7C:
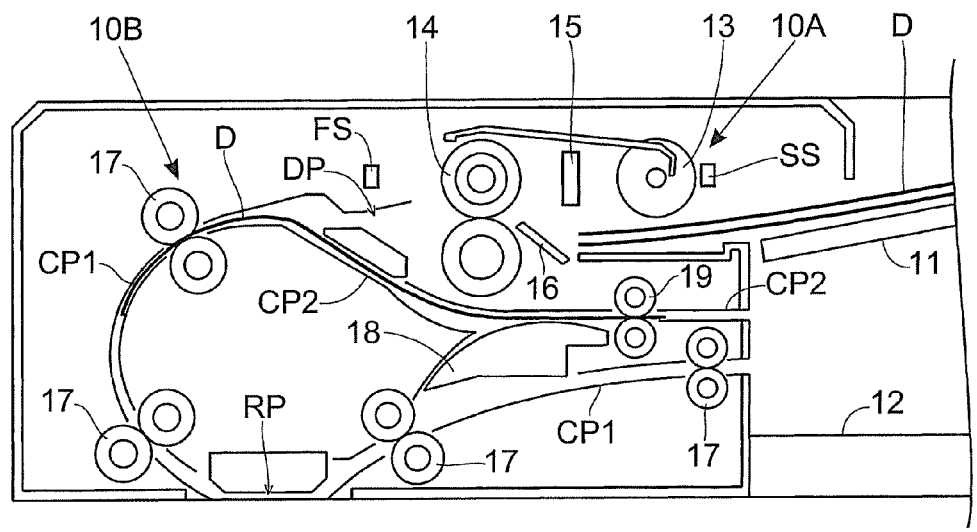
FIG. 7C is a diagram for explaining the operation of transporting the document when a plurality of sheets of the document are set on the document setting tray in the image reading device illustrated in FIG. 1.

Next, as illustrated in FIG. 7C, the document transport portion 10B transports the turned-over document D (whose front and rear in the document transport direction is reversed) along the main transport path CP1. In this way, the document D is transported to the read position RP and passes the read position RP again. In this case, because the document D is turned over, the other side (unread side) of the document D is read in the read position RP.

Figure 7D:
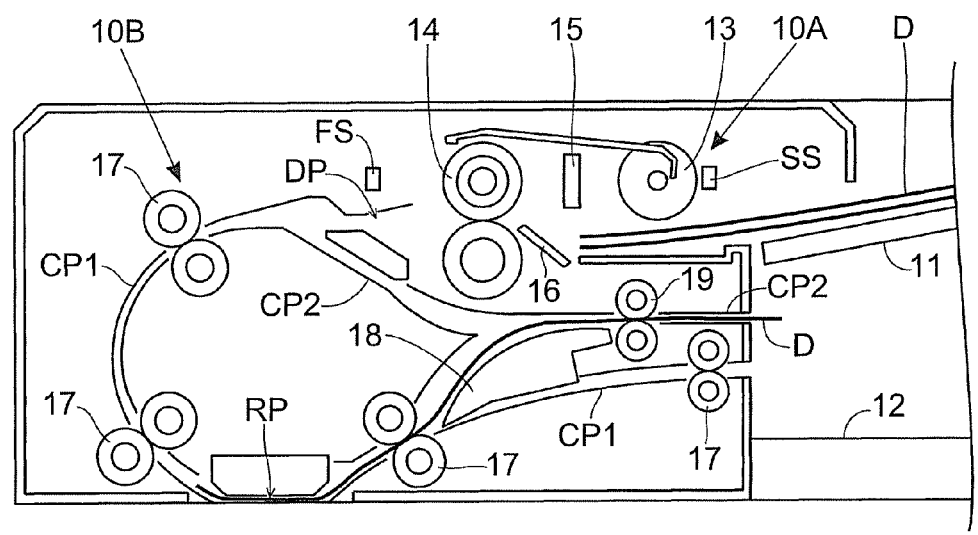
FIG. 7D is a diagram for explaining the operation of transporting the document when a plurality of sheets of the document are set on the document setting tray in the image reading device illustrated in FIG. 1.
Figure 7E:
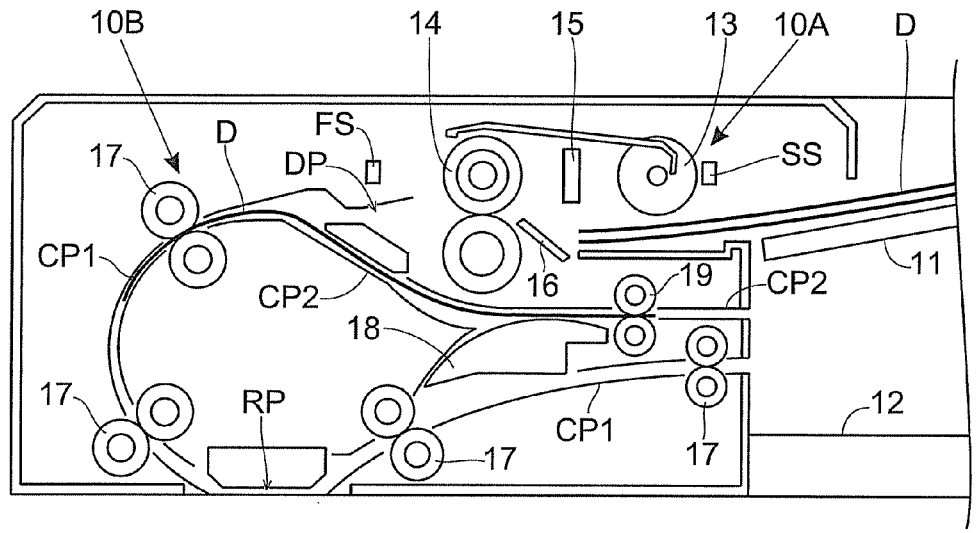
FIG. 7E is a diagram for explaining the operation of transporting the document when a plurality of sheets of the document are set on the document setting tray in the image reading device illustrated in FIG. 1.

In addition, the document transport portion 10B swings the switching claw 18 so that the document transport path between the main transport path CP1 and the reversing transport path CP2 is opened before the front end of the document D whose both sides have been read reaches the branch point of the main transport path CP1 and the reversing transport path CP2. Therefore, as illustrated in FIG. 7D, the document D after passing the read position RP (the document D whose both sides have been read) is sent to the reversing transport path CP2. After this, the document transport portion 10B performs the document reversing operation again. In this way, as illustrated in FIG. 7E, the document D whose front and rear ends in the document transport direction are reversed again (the document D whose both sides have been read) returns to a position on the upstream side in the document transport direction of the read position RP in the main transport path CP1.

Figure 7F:
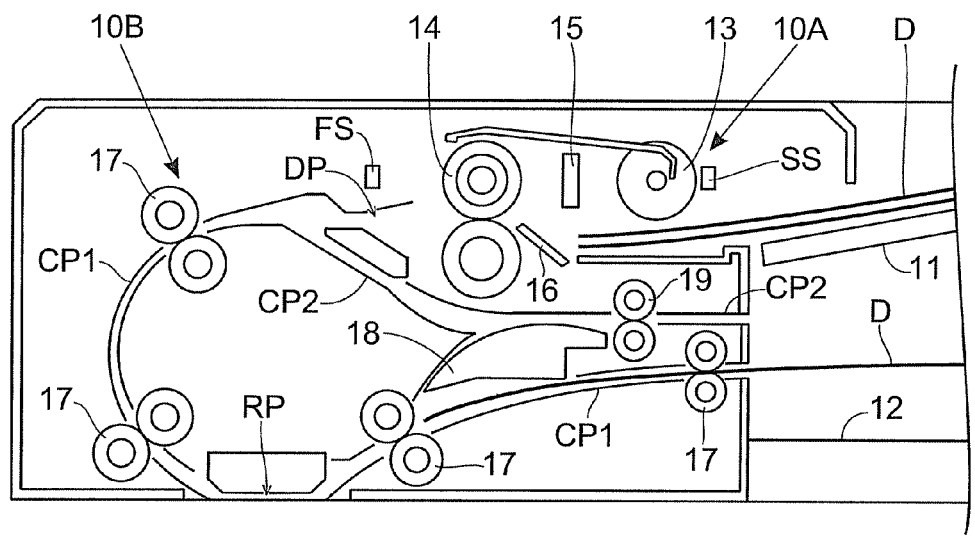
FIG. 7F is a diagram for explaining the operation of transporting the document when a plurality of sheets of the document are set on the document setting tray in the image reading device illustrated in FIG. 1.

Further, as illustrated in FIG. 7F, the document transport portion 10B transports the document D that is again turned over (document D whose both sides have been read) along the main transport path CP1 and discharges the document D to the document discharge tray 12. In other words, in this case, the document transport portion 10B swings the switching claw 18 so that the document transport path between the main transport path CP1 and the reversing transport path CP2 is blocked. Note that also for the second and subsequent sheets of the document D, both sides are read similarly to the first sheet of the document D, and the sheet is turned over again and then is discharged onto the document discharge tray 12.

Next, an operation of discharging the document D in the second sheet discharging mode is described. Note that in the following description, it is supposed that a bunch of the document (a plurality of stacked sheets of the document D) is set on the document setting tray 11.

First, when an instruction to execute the double-sided reading job is accepted, an operation similar to that illustrated in FIGS. 7A to 7C is performed. In other words, the document D is turned over so that both sides of the document D are alternately read in a single read position RP.

Here, in the second sheet discharging mode, unlike the first sheet discharging mode, the operations illustrated in FIGS. 7D and 7E are omitted, and the operation illustrated in FIG. 7F is performed. Specifically, the document transport path between the main transport path CP1 and the reversing transport path CP2 is blocked by the switching claw 18 so that the document D whose both sides have been read (the turned-over document D) is not sent to the reversing transport path CP2. In this way, the document D whose both sides have been read is not sent to the reversing transport path CP2 but is transported along the main transport path CP1 as it is, so as to be discharged onto the document discharge tray 12. In other words, the document D whose both sides have been read is not turned over and discharged onto the document discharge tray 12. Note that also for the second and subsequent sheets of the document D, both sides are read similarly to the first sheet of the document D, and the sheet is discharged onto the document discharge tray 12 without being turned over again.

In this way, in the first sheet discharging mode, the document D discharged onto the document discharge tray 12 is turned over again. Therefore, one side of the document D (facing upward when the document is set) is caused to face the document discharge tray 12 side (to face downward). In this state, the sheets of the document D are stacked on the document discharge tray 12 in order from the first read sheet (uppermost sheet when the document D is set). In this way, pages of the plurality of sheets of the document D stacked on the document discharge tray 12 are sorted in order. For instance, it is supposed that two sheets of the document D are set on the document setting tray 11, one side of the first sheet of the document D that is the uppermost side when the document is set is the first page, the other side of the first sheet is the second page, one side of the second sheet of the document D is the third page, and the other side of the second sheet is the fourth page. In this case, when the two sheets of the document D are turned over again and are stacked in order on the discharge tray 12, the one side of the first sheet of the document D (the first page) faces downward, and the one side of the second sheet of the document D (the third page) also faces downward. Therefore, pages of the two sheets of the document D are sorted in order. However, in the first sheet discharging mode, because the sheets of the document D are turned over again, time from start to end of the double-sided reading job is elongated.

On the other hand, in the second sheet discharging mode, sheets of the document D are not turned over again before being discharged onto the document discharge tray 12. Therefore, the time from start to end of the double-sided reading job is shortened because the sheets of the document D are not turned over. However, in the second sheet discharging mode, the one side of the sheet of the document D (facing upward when the document is set) faces upward (the same direction as when the document is set). In this state, the sheets of the document D are stacked in order from the first read sheet (the uppermost sheet when the document is set) on the document discharge tray 12. Therefore, pages of the plurality of sheets of the document D stacked on the document discharge tray 12 are not sorted in order.

Therefore, this embodiment is configured to accept an instruction to select one of the first sheet discharging mode and the second sheet discharging mode for discharging the document D. In this way, the first sheet discharging mode can be selected in order to sort pages of the plurality of sheets of the document D discharged and stacked on the document discharge tray 12 to be in order, while the second sheet discharging mode can be selected in order to promptly finish the double-sided reading job.

However, in this embodiment, when only one sheet of the document D is set on the document setting tray 11, the document D is discharged in the second sheet discharging mode regardless of the selected sheet discharging mode out of the first sheet discharging mode and the second sheet discharging mode. Hereinafter, with reference to FIGS. 8A to 8D, discharging operation of the document D when only one sheet of the document D is set on the document setting tray 11 is described.

Figure 8A:
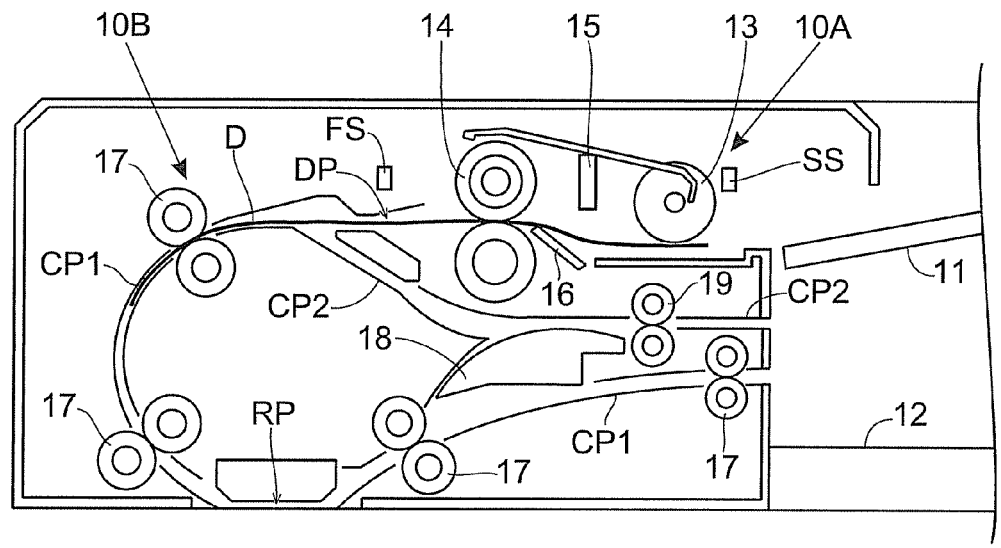
FIG. 8A is a diagram for explaining the operation of transporting the document when only one sheet of the document is set on the document setting tray in the image reading device illustrated in FIG. 1.

First, when the instruction to execute the double-sided reading job is accepted, the document transport controller 120 controls the document sheet feeder 10A to perform the sheet feed operation and controls the document transport portion 10B to perform the document transport operation. In other words, as illustrated in FIG. 8A, the document sheet feeder 10A feeds the document D set on the document setting tray 11 to the main transport path CP1. Further, the document transport portion 10B transports the document D fed to the main transport path CP1 to the read position RP. In this way, when the document D passes the read position RP, one side of the document D is read in the read position RP.

Figure 8B:
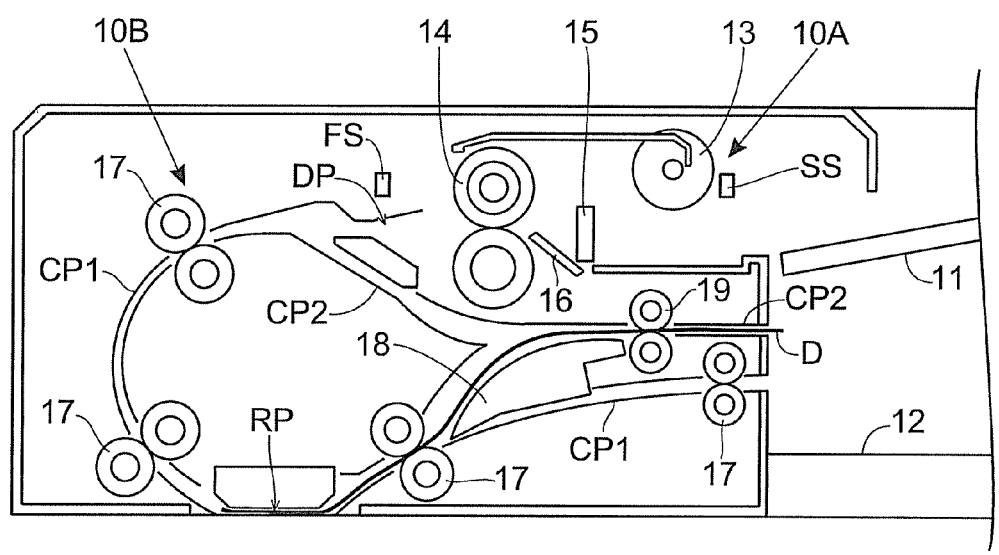
FIG. 8B is a diagram for explaining the operation of transporting the document when only one sheet of the document is set on the document setting tray in the image reading device illustrated in FIG. 1.

In addition, the document transport portion 10B swings the switching claw 18 so that the document transport path between the main transport path CP1 and the reversing transport path CP2 is opened before the front end of the document D reaches the branch point of the main transport path CP1 and the reversing transport path CP2. In this way, as illustrated in FIG. 8B, the document D after passing the read position RP is sent to the reversing transport path CP2.

Here, when detecting that the rear end of the document D passes the detection position DP (detecting that the rear end of the document D is released from the document sheet feeder 10A) based on an output of the document transport sensor FS, the document transport controller 120 detects whether or not the document D exists at the document setting tray 11 based on an output of the document set sensor SS. In other words, when the first sheet of the document D is fed to the main transport path CP1, presence or absence of the document D on the document setting tray 11 is detected. In this case, when there is no document D at the document setting tray 11, it means that only one sheet of the document D was set on the document setting tray 11 (only the sheet of the document D that is currently being transported). Therefore, when it is detected that there is no document D at the document setting tray 11, the document transport controller 120 sets so that the document D is discharged in the second sheet discharging mode regardless of the selected sheet discharging mode out of the first sheet discharging mode and the second sheet discharging mode.

Figure 8C:
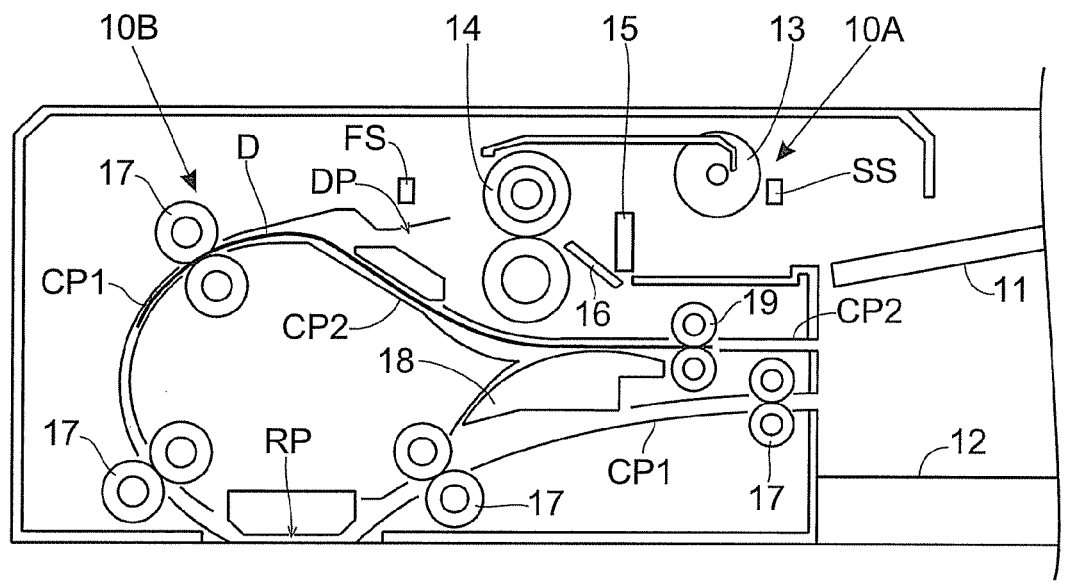
FIG. 8C is a diagram for explaining the operation of transporting the document when only one sheet of the document is set on the document setting tray in the image reading device illustrated in FIG. 1.

After that, as illustrated in FIG. 8C, the document transport portion 10B performs the document reversing operation and transports the turned-over document D along the main transport path CP1. In this way, the document D is transported to the read position RP and passes the read position RP again. In this case, because the document D is turned over, the other side (unread side) of the document D is read in the read position RP.

Figure 8D:
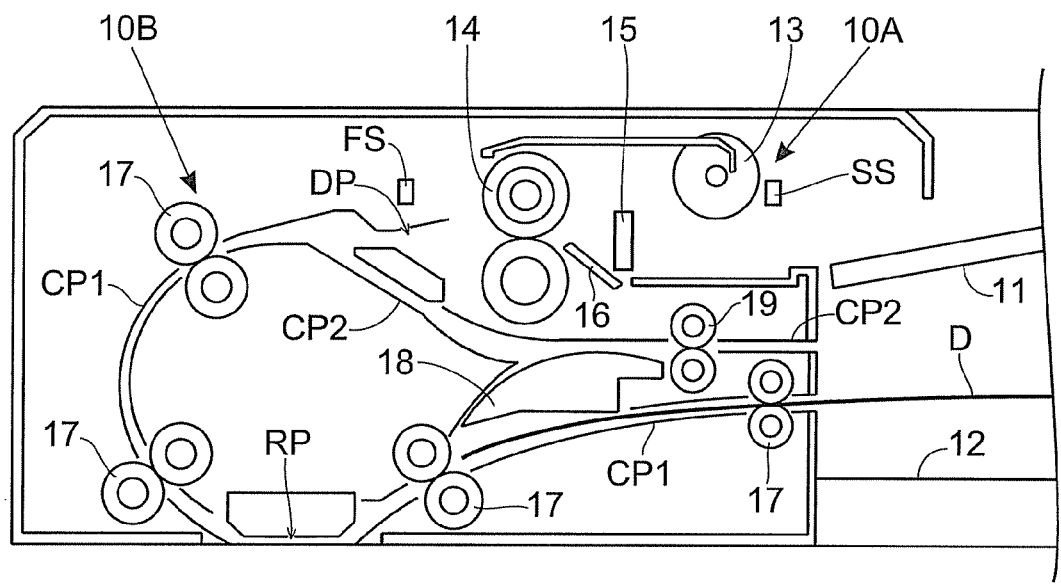
FIG. 8D is a diagram for explaining the operation of transporting the document when only one sheet of the document is set on the document setting tray in the image reading device illustrated in FIG. 1.

In addition, because it is set to discharge the document D in the second sheet discharging mode in this case, the document transport portion 10B maintains the switching claw 18 to block the document transport path between the main transport path CP1 and the reversing transport path CP2. In this way, as illustrated in FIG. 8D, the document D whose both sides have been read is not sent to the reversing transport path CP2 but is transported along the main transport path CP1 as it is, so as to be discharged onto the document discharge tray 12. In other words, regardless of the selected sheet discharging mode out of the first sheet discharging mode and the second sheet discharging mode, the document transport portion 10B discharges the document D onto the document discharge tray 12 without turning over again the document D whose both sides have been read (discharges the document D in the second sheet discharging mode).

Hereinafter, with reference to the flowchart illustrated in FIG. 9, a control flow when the sheet discharging mode is set is described.

Figure 9:
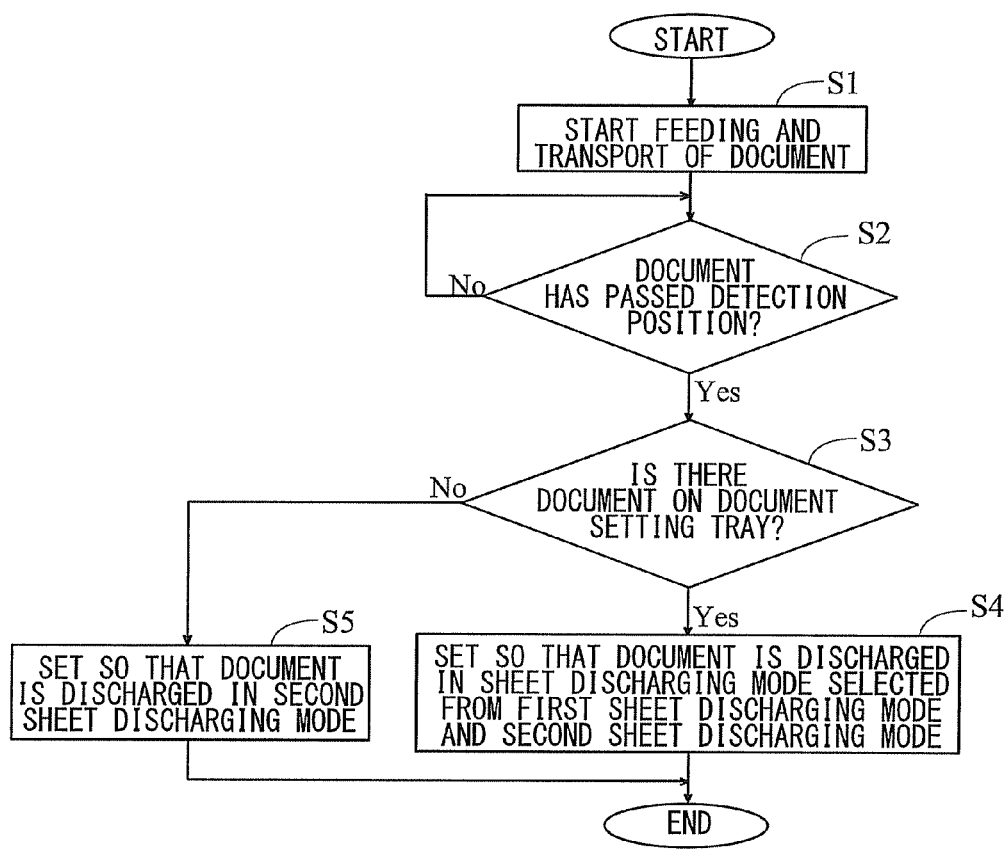
FIG. 9 is a flowchart for explaining a control flow when setting the sheet discharging mode in the image reading device illustrated in FIG. 1.

It is supposed that one of the first sheet discharging mode and the second sheet discharging mode is selected when the flowchart of FIG. 9 starts. Further, when the instruction to execute the double-sided reading job is accepted in a state where one or more sheets of document D are set on the document setting tray 11, the flowchart of FIG. 9 starts.

In Step S1, the document transport controller 120 controls the document sheet feeder 10A to start the sheet feed operation. In addition, the document transport controller 120 controls the document transport portion 10B to start the document transport operation. Then, in Step S2, the document transport controller 120 determines whether or not the rear end of the document D has passed the detection position DP (whether or not the first sheet of the document D has been fed to the main transport path CP1) based on the output of the document transport sensor FS. As a result, when the rear end of the document D has passed the detection position DP, the process proceeds to Step S3. When the rear end of the document D has not yet passed the detection position DP, the determination of Step S2 is repeated.

When the process proceeds to Step S3, the document transport controller 120 determines whether or not there is the document D on the document setting tray 11 based on the output of the document set sensor SS. As a result, when there is the document D on the document setting tray 11, the process proceeds to Step S4. Note that when there is the document D on the document setting tray 11 at this time point, it means that a plurality of sheets of the document D was set on the document setting tray 11.

When the process proceeds to Step S4, the document transport controller 120 sets so that the document D is discharged in the selected sheet discharging mode out of the first sheet discharging mode and the second sheet discharging mode.

On the other hand, when there is no document D on the document setting tray 11 in Step S3, the process proceeds to Step S5. Note that when there is no document D on the document setting tray 11 at this time point, it means that only one sheet of the document D was set on the document setting tray 11.

When the process proceeds to Step S5, the document transport controller 120 sets so that the document D is discharged in the second sheet discharging mode.

The image forming apparatus 100 (image reading device 200) of this embodiment includes the document setting tray 11 on which the document D is set, the image reader 20 configured to read the document D in the read position RP, the document discharge tray 12 onto which the document D after reading is discharged, the main transport path CP1 from the document setting tray 11 via the read position RP to the document discharge tray 12, the reversing transport path CP2 that branches from the main transport path CP1 on a downstream side of the read position RP and joins the main transport path CP1 on an upstream side of the read position RP of the main transport path CP1, the document transport controller 120 for controlling to transport the document D along the main transport path CP1, and controlling to transport the document D whose one side has been read in the read position RP along the reversing transport path CP2 so as to turn over the document D and to transport the turned-over document D to the read position RP when performing the double-sided reading job, and the operation panel 8 (operation portion) configured to accept the setting instruction concerning the double-sided reading job. Further, the document transport controller 120 controls to discharge the document D in one of the two sheet discharging modes including the first sheet discharging mode in which the document D is turned over again after both sides of the document D have been read in the read position RP and then is discharged onto the document discharge tray 12, and the second sheet discharging mode in which the document D is discharged onto the document discharge tray 12 without being turned over again. The operation panel 8 accepts the instruction to select one of the first sheet discharging mode and the second sheet discharging mode to discharge the document D.

In this embodiment, when performing the double-sided reading job, the user can select a desired sheet discharging mode from the first sheet discharging mode and the second sheet discharging mode. In other words, when it is desired to sort pages of the plurality of sheets of the document D discharged onto the document discharge tray 12, it is possible to turn over the sheets of the document D again before the sheets of document D are discharged onto the document discharge tray 12. Further, when it is desired to promptly finish the double-sided reading job, it is possible to discharge the document D onto the document discharge tray 12 without turning over the document D again (to omit the operation to turn over the document D). Therefore, it is possible to improve usability for both the user who wants to sort pages of the plurality of sheets of the document D discharged onto the document discharge tray 12 and the user who wants to promptly finish the double-sided reading job.

For instance, when the plurality of sheets of the document D are read to generate electronic data to be stored, and the plurality of sheets of the document D after reading are discarded, it is not necessary that pages of the plurality of sheets of the document D discharged onto the document discharge tray 12 are sorted in order. In this case, when it is set that the document D is discharged only in the first sheet discharging mode, the operation of turning over the document D is executed despite the fact that the operation is not necessary, which is burdensome for the user. However, when the second sheet discharging mode is selectable as the sheet discharging mode, the unnecessary operation (of turning over the document D) can be omitted so that the double-sided reading job is promptly finished, and hence usability for the user is improved.

In this way, in this embodiment, it is possible to provide the image reading device 200 and the image forming apparatus 100 including the image reading device 200, in which the double-sided reading job can be executed for alternately reading both sides of the document D in the single read position RP by turning over the document D, and hence usability for the user who performs the double-sided reading job can be improved.

In addition, in this embodiment, as described above, when the first sheet of the document D is fed to the main transport path CP1, and when the document transport controller 120 detects that there is no document D on the document setting tray 11, the document D is discharged in the second sheet discharging mode regardless of the selected sheet discharging mode out of the first sheet discharging mode and the second sheet discharging mode. In other words, when only one sheet of the document D was set on the document setting tray 11, the document D is discharged automatically in the second sheet discharging mode. Here, when only one sheet of the document D was set on the document setting tray 11, even if the sheet of the document D is discharged onto the document discharge tray 12 without being turned over again, usability for the user is not degraded. Therefore, when only one sheet of the document D was set on the document setting tray 11, it is preferred to promptly finish the double-sided reading job by discharging the document D in the second sheet discharging mode.

Note that in the structure described above, it is possible to have a configuration that the operation panel 8 accepts whether or not to discharge the document D in the first sheet discharging mode regardless of the number of sheets of the document D set on the document setting tray 11 when the first sheet discharging mode is selected. For instance, when the software key K1 is touched on the acceptance screen SS1 (see FIG. 6), the operation panel 8 displays an acceptance screen SS2 as illustrated in FIG. 10 and accepts whether or not to discharge the document D in the first sheet discharging mode regardless of the number of sheets of the document D set on the document setting tray 11.

Figure 10:
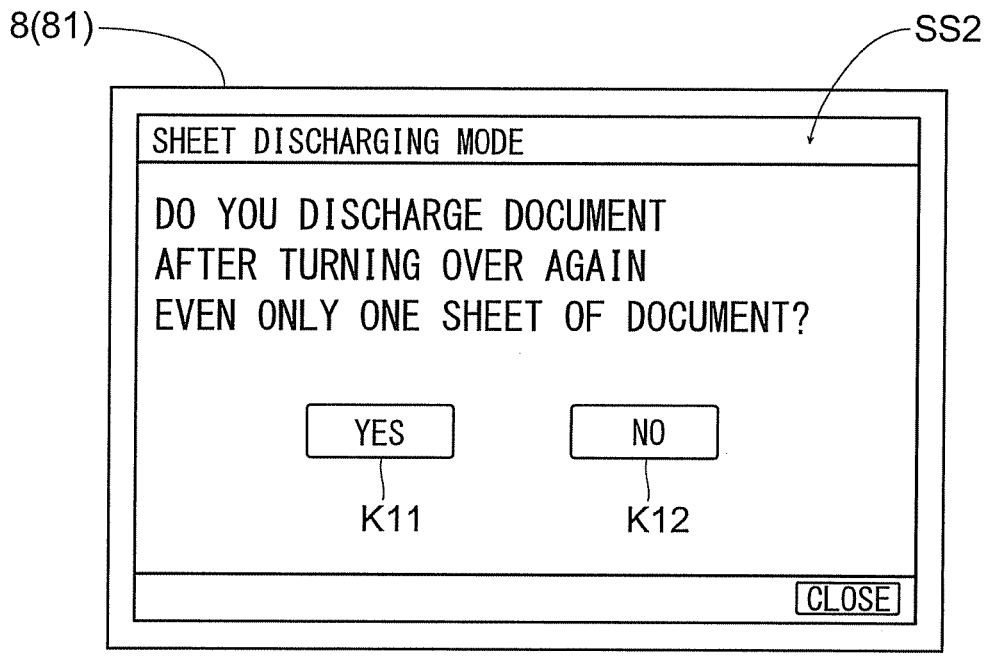
FIG. 10 is a diagram of an acceptance screen displayed when accepting detail setting of the sheet discharging mode in the image reading device illustrated in FIG. 1.

When a software key K1 indicating "YES" is touched on the acceptance screen SS2 illustrated in FIG. 10, it is set so that the document D is discharged in the first sheet discharging mode regardless of the number of sheets of the document D set on the document setting tray 11. In this case, even if the document transport controller 120 detects that there is no document D on the document setting tray 11 (even if only one sheet of the document D was set on the document setting tray 11) when feeding of the first sheet of the document D to the main transport path CP1 is completed, the document transport controller 120 controls to discharge the document D not in the second sheet discharging mode but in the first sheet discharging mode.

On the other hand, when a software key K12 indicating "NO" is touched on the acceptance screen SS2 illustrated in FIG. 10, it is set so that the sheet discharging mode is switched in accordance with the number of sheets of the document D set on the document setting tray 11. Specifically, when a bunch of document (a plurality of stacked sheets of the document D) is set on the document setting tray 11, the document D is discharged in the first sheet discharging mode. When only one sheet of the document D is set on the document setting tray 11, the document D is discharged in the second sheet discharging mode.

With this structure, even if only one sheet of the document D is set on the setting tray 11, the document D can be discharged in the first sheet discharging mode, and hence usability for the user is good.

In addition, in the structure described above, it is possible to have a configuration that the operation panel 8 accepts the number of sheets of the document D to be discharged in the second sheet discharging mode when the second sheet discharging mode is selected. For instance, when the software key K2 is touched on the acceptance screen SS1 (see FIG. 6), the operation panel 8 displays an acceptance screen SS3 as illustrated in FIG. 11 and accepts the number of sheets of the document D to be discharged in the second sheet discharging mode.

Figure 11:
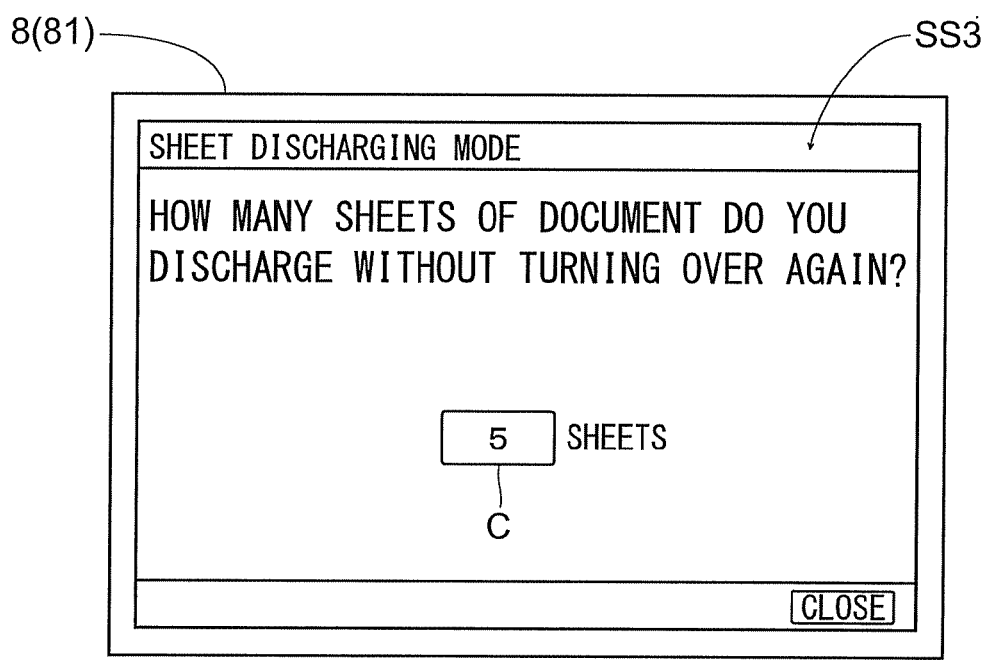
FIG. 11 is a diagram of the acceptance screen displayed when accepting the detail setting of the sheet discharging mode in the image reading device illustrated in FIG. 1.

When a numerical value is input in an input box C on the acceptance screen SS3 illustrated in FIG. 11, the number of sheets of the document D corresponding to the numeric value are discharged in the second sheet discharging mode. For instance, when a numerical value "5" is input in the input box C, the first to fifth sheets of the document D are discharged in the second sheet discharging mode. In this case, when six or more sheets of document D are set on the document setting tray 11, the first to fifth sheets of the document D are discharged in the second sheet discharging mode, but the sixth and subsequent sheets of the document D are discharged in the first sheet discharging mode. In other words, the document transport portion 10B discharges the sheets of the document D corresponding to the numerical value accepted by the operation panel 8 in the second sheet discharging mode, and then discharges remaining sheets of the document D in the first sheet discharging mode when there are remaining sheets of the document D on the document setting tray 11.

With this structure, the number of sheets of the document D to be discharged in the second sheet discharging mode can be set to an arbitrary number, and hence usability for the user is improved.

The embodiment disclosed in this specification is merely an example in every aspect and should not be interpreted as a limitation. The scope of the present disclosure is defined not by the above description of the embodiment but by the claims, and further includes all modifications within the meanings and scope equivalent to the claims.

What is claimed is:

1. An image reading device capable of performing a double-sided reading job which reads both sides of a document alternately at a single read position by turning over the document, comprising:
    a document setting tray on which the document is set;
    an image reader configured to read the document in the read position;
    a document discharge tray onto which the document after reading is discharged;
    a main transport path from the document setting tray via the read position to the document discharge tray;
    a reversing transport path branching from the main transport path on a downstream side of the read position and joining the main transport path on an upstream side of the read position of the main transport path;
    a document transport controller for controlling to transport the document along the main transport path, and controlling to transport the document whose one side has been read in the read position along the reversing transport path so as to turn over the document and to transport the turned-over document to the read position when performing the double-sided reading job; and
    an operation portion configured to accept a setting instruction concerning the double-sided reading job, wherein
    the document transport controller controls to discharge the document in one of two sheet discharging modes including a first sheet discharging mode in which the document is turned over again after both sides of the document have been read in the read position and then is discharged onto the document discharge tray, and a second sheet discharging mode in which the document is discharged onto the document discharge tray without being turned over again,
    the operation portion accepts an instruction to select one of the first sheet discharging mode and the second sheet discharging mode to discharge the document, and
    in the double-sided reading job,
        when the first sheet discharging mode is selected, the document transport controller controls to discharge in the first sheet discharging mode the document with which the double-sided reading has been finished, and
        when the second sheet discharging mode is selected, the document transport controller controls to discharge in the second sheet discharging mode the document with which the double-sided reading has been finished.

2. The image reading device according to claim 1, further comprising a document set detector which detects presence or absence of the document on the document setting tray, wherein
    when the document set detector detects that there is no document when feeding of a first sheet of the document to the main transport path is completed, the document transport controller controls to discharge the document in the second sheet discharging mode regardless of the selected sheet discharging mode out of the first sheet discharging mode and the second sheet discharging mode.

3. An image forming apparatus comprising the image reading device according to claim 2.

4. The image reading device according to claim 1, further comprising a document set detector for detecting presence or absence of the document on the document setting tray, wherein
    when the first sheet discharging mode is selected, the operation portion can accept the first sheet discharging mode regardless of the number of sheets of the document set on the document setting tray, and
    when the operation portion accepts the first sheet discharging mode, the document transport controller discharges the document in the first sheet discharging mode even if the document set detector detects there is no document when feeding of the first sheet of the document to the main transport path is finished.

5. An image forming apparatus comprising the image reading device according to claim 4.

6. The image reading device according to claim 1, wherein
    the operation portion accepts the number of sheets of the document to be discharged in the second sheet discharging mode among the sheets of the document set on the document setting tray when the second sheet discharging mode is selected, and
    the document transport controller controls to discharge the sheets of the document corresponding to the number of sheets accepted by the operation portion in the second sheet discharging mode.

7. The image reading device according to claim 6, wherein the document transport controller discharges the sheets of the document corresponding to the number of sheets accepted by the operation portion in the second sheet discharging mode, and then discharges remaining sheets of the document in the first sheet discharging mode when there are remaining sheets of the document on the document setting tray.

8. An image forming apparatus comprising the image reading device according to claim 7.

9. An image forming apparatus comprising the image reading device according to claim 6.

10. An image forming apparatus comprising the image reading device according to claim 1.

* * * * *